(12) United States Patent
Choiniere et al.

(10) Patent No.: US 10,911,696 B2
(45) Date of Patent: Feb. 2, 2021

(54) BROAD BAND CAMERA CORE

(71) Applicant: BAE Systems Information and Electronic Systems Integration Inc., Nashua, NH (US)

(72) Inventors: Michael J. Choiniere, Merrimack, NH (US); Pierre-Alain S. Auroux, Rockville, MD (US); Michael Bowers, Sykesville, MD (US); Myeongseob Kim, Ellicott City, MD (US); Michael DeWeert, Kaneohe, HI (US); Don A. Harris, Columbia, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/644,361

(22) PCT Filed: Sep. 7, 2017

(86) PCT No.: PCT/US2017/050370
§ 371 (c)(1),
(2) Date: Mar. 4, 2020

(87) PCT Pub. No.: WO2019/050516
PCT Pub. Date: Mar. 14, 2019

(65) Prior Publication Data
US 2020/0204744 A1    Jun. 25, 2020

(51) Int. Cl.
*H04N 5/33* (2006.01)
*G01J 1/02* (2006.01)
(Continued)

(52) U.S. Cl.
CPC .................. *H04N 5/33* (2013.01); *G01J 1/02* (2013.01); *G01J 1/32* (2013.01); *G01J 5/046* (2013.01);
(Continued)

(58) Field of Classification Search
CPC ...... H04N 5/33; G01J 1/32; G01J 1/02; G01J 5/046; G01J 5/0803; G01J 2005/0077
(Continued)

(56) References Cited

U.S. PATENT DOCUMENTS

| 9,397,237 B2 | 7/2016 | Ushinsky et al. |
| 2007/0023661 A1 | 2/2007 | Wagner et al. |
| 2011/0062329 A1* | 3/2011 | Ben-Bassat ........... G01J 5/0837 250/330 |

(Continued)

OTHER PUBLICATIONS

Song et al. Reproducing the Hierarchy of disorder for Morpho-inspired broad angle color reflection. Scientific Reports. Apr. 7, 2017. (Retrieved Oct. 21, 2017). Retrieved from internet<https://www/nature/com/articles/srep46023> entire document.

(Continued)

*Primary Examiner* — Robert Chevalier
(74) *Attorney, Agent, or Firm* — Scott J. Asmus; Davis & Bujold, PLLC

(57) ABSTRACT

The system and method for using morpho photonic structures to form small, lightweight imagers for use with SWIR, MWIR and LWIR. In some cases, the morpho photonic structure imagers are used in googles. The morpho photonic structure imagers have a frame rate ranging from 100 Hz to 200 Hz. In some cases, using a cluster of short wave infrared, mid wave infrared, and long wave infrared sensors to form a multi-spectral image is used to scan for chemical fingerprints.

9 Claims, 1 Drawing Sheet

(51) Int. Cl.
  *G01J 1/32* (2006.01)
  *G01J 5/04* (2006.01)
  *G01J 5/08* (2006.01)
  *H04N 5/30* (2006.01)
  *G01J 5/00* (2006.01)

(52) U.S. Cl.
  CPC ..... *G01J 5/0803* (2013.01); *G01J 2005/0077* (2013.01)

(58) Field of Classification Search
  USPC .................. 348/164, 162, 163, 165, 169
  See application file for complete search history.

(56) References Cited

U.S. PATENT DOCUMENTS

| | | |
|---|---|---|
| 2012/0154629 A1 | 6/2012 | Horiuchi |
| 2012/0250135 A1* | 10/2012 | Yeh .................. G02B 5/201 359/267 |
| 2016/0131808 A1 | 5/2016 | Kristensen et al. |

OTHER PUBLICATIONS

Zhang et al. Nanofabrication and coloration study of artificial Morpho butterfly wings with aligned lamellae layers. Scientific Reports. Nov. 18, 2015. (Retrieved Oct. 21, 2017). Retrieved from internet<https://www.nature.com/articles/srep16637.pdf> entire document.

International Search Report, PCT/US2017/050370, dated Nov. 20, 2017, 28 pages.

\* cited by examiner

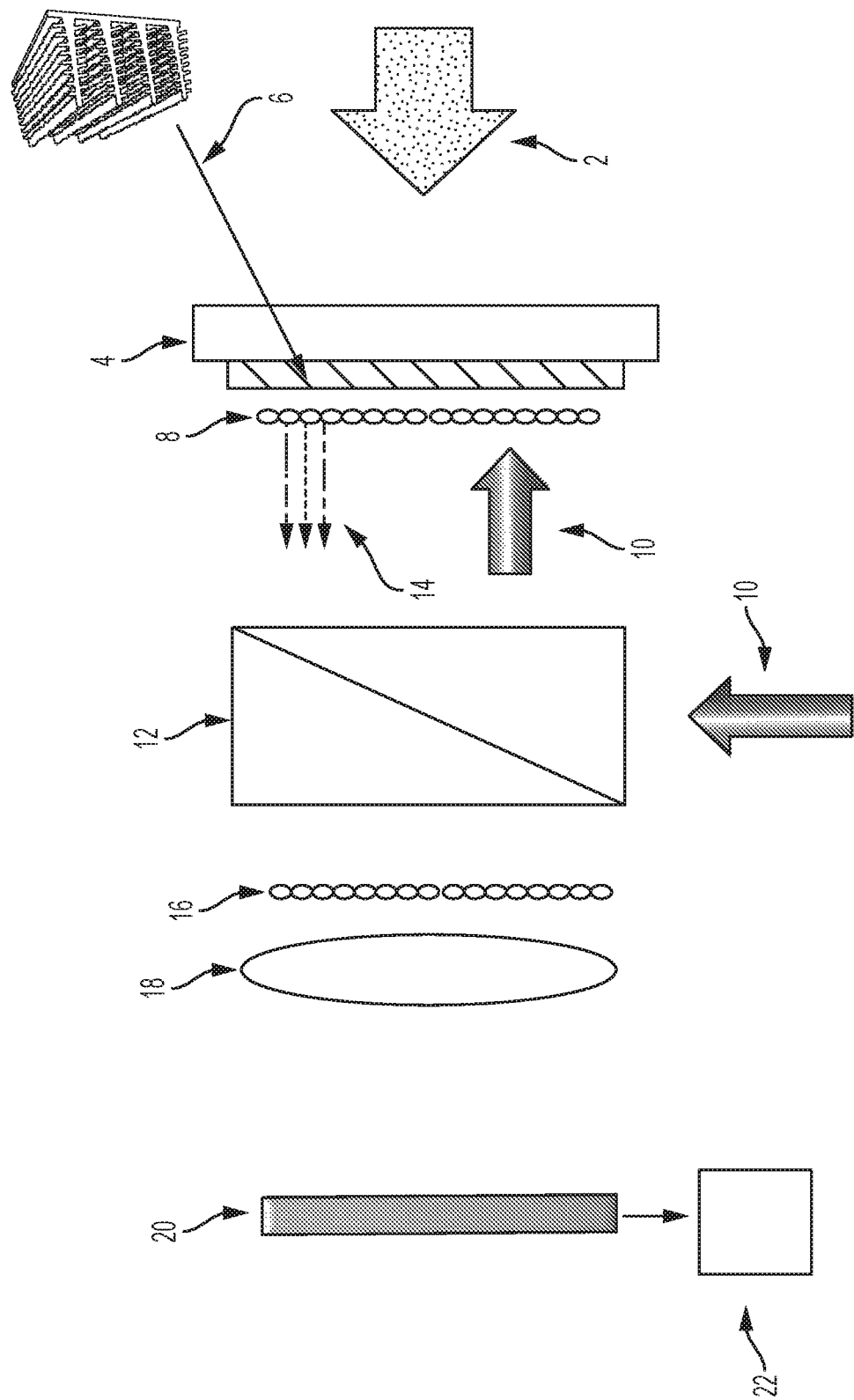

BROAD BAND CAMERA CORE

FIELD OF THE DISCLOSURE

The present disclosure relates to imagers, and more particularly to the use of morpho photonic structures to create very small imagers such as those used in googles.

BACKGROUND OF THE DISCLOSURE

Traditional goggle technology utilizes a form of image intensifier (I2) tube, coupled with a long wave infrared (LWIR) thermal sensor for enemy detection under concealed areas. An image intensifier or image intensifier tube is a vacuum tube device for increasing the intensity of available light in an optical system to allow use under low-light conditions, such as at night, to facilitate visual imaging of low-light processes, such as fluorescence of materials in x-rays or gamma rays (x-ray image intensifier), or for conversion of non-visible light sources, such as near-infrared or short wave infrared to visible. I2 tubes operate by converting photons of light into electrons, amplifying the electrons (usually with a microchannel plate), and then converting the amplified electrons back into photons for viewing. They are used in devices such as night vision goggles.

The existing architecture creates a limitation that results in no multi-spectral sensing, <60 Hz bandwidth of the thermal sensor, and an analogous Vis/NIR sensor which cannot be post processed to achieve a higher level performance. These uncooled thermal sensors are typically 30 to 60 Hz devices due to the thermal time constant of the micro bolometers and read outs; and are progressively scanned.

Wherefore it is an object of the present disclosure to overcome the above-mentioned shortcomings and drawbacks associated with the prior art goggles. These aspects of the disclosure are not meant to be exclusive and other features, aspects, and advantages of the present disclosure will be readily apparent to those of ordinary skill in the art when read in conjunction with the following description and accompanying drawings.

SUMMARY OF THE DISCLOSURE

One aspect of the present disclosure is a broad band camera core comprising a morpho photonic structure having nanostructures for forming an optical diffraction grating, the morpho photonic structure being configured to generate a plurality of thermal gradients when exposed to thermal energy; a light source configured to provide white light to the morpho photonic structure, such that the plurality of thermal gradients alters the diffraction grating at the micro level and when exposed to white light only reflects a color corresponding to a matching thermal gradient, providing a color variation in a resulting thermal image; and re-imaging optics for collecting reflected color light and re-imaging onto a CMOS silicon imager to form a thermal sensor.

One embodiment of the broad band camera core further comprises a beam splitter for injecting white light. In some cases, the broad band camera core further comprises a combination of micro and macro optics for re-imaging.

Another embodiment of the broad band camera core is wherein the camera core weighs only a few ounces and fits in about a 2 cm3 package. In certain embodiments, the broad band camera core has a frame rate of between 100 Hz and 200 Hz with a global shutter.

Yet another embodiment of the broad band camera core is wherein the camera core is used in goggles. In some cases, the camera core is configured for use with short wave infrared, mid wave infrared, and long wave infrared. In certain embodiments, using a cluster of short wave infrared, mid wave infrared and long wave infrared sensors forms a multi-spectral image used to scan for chemical fingerprints.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1 shows one embodiment of the system of the present disclosure with a morpho photonic structure that responds to incoming thermal energy in SWIR, MWIR or LWIR.

DETAILED DESCRIPTION OF THE DISCLOSURE

One embodiment of the system of the present disclosure couples a complementary metal-oxide semiconductor (CMOS) color camera, or the like, to morpho photonic structures. Using a CMOS applied to the morpho photonic structures eliminates non-linearities in the structures response, tailors the image the user's needs, provides higher bandwidth with dynamic smear correction, all while being adaptable to a common camera core camera for short wave infrared (SWIR), mid wave infrared (MWIR), and long wave infrared (LWIR) applications in a very small volume. In certain cases, the system is contained within about a 2 cm$^3$ package. Additionally, this architecture provides all the benefits of the commercial processing, bandwidth, and high resolution of color CMOS camera at a low cost.

One embodiment of the system of the present disclosure is a detection architecture which utilizes an engineered material inspired by the low thermal mass resonator structure of iridescent Morpho butterfly scales, along with the spectral selectivity of metal and metal-oxide nanoparticles to create a common camera core with a selectable detection band across the NIR/SWIR, MWIR, and LWIR, enabling night vision goggles with the form factor of eye glasses. The Morpho inspired structure consists of periodic ridges, which are perpendicular to the surface, upon which periodically spaced lamellae branches extend. The multilayer interference of light on the lamellae and the diffraction from the ridges produce the iridescent blue color seen on the Morpho butterfly. The color seen by the observer does not come from a pigment, but rather the interaction of incident light with the structure itself. Infrared light incident on the system causes thermal expansion of the Morpho inspired nanostructure. The structure is backlit with a white light source and its reflection is imaged onto a color CMOS focal plane array. The thermal expansion from the incident infrared radiation causes a micro expansion/contraction change on the Morpho structure. The micro dimensional change results in a diffraction, localized color shift of the reflected visible radiation, which is detected by the CMOS array.

Referring to FIG. 1, a morpho photonic structure that responds to incoming thermal energy in SWIR, MWIR or LWIR is shown. More specifically, the thermal energy incident to the morpho photonic structure 6 generates a thermal gradient as depicted by the color variation 14. The tree-like structures form an optical diffraction grating. The thermal gradient alters diffraction grating at the micro level and when exposed to white light 10 only reflects the color corresponding to a thermal gradient; providing a color variation of the thermal image. The injection of white light 10 can be accomplished via beam splitters 12, fiber optics, or LEDs on the substrates. The re-imaging optics can be accomplished by a combination of micro 16 and macro 18 optics at the substrate or array level. The combination of radiating the white light 10 onto the diffraction grating 6 and collecting the reflected color light 14 that is reimaged onto a standard CMOS silicon imager 20 forms the basis of low cost, lower volume/weight thermal sensor; configured for SWIR, MWIR and LWIR.

The morpho photonic structure shown in FIG. 1 is one representative example of several design options that are currently in development. The morpho structure is purely an analogy device that could be imaged through an eyepiece to provide an image. Any imager's raw video typically contains artifacts that are distracting to the human eye, such as nonlinear color distribution or balance, limited dynamic range concealing key scene features, contrast edge softening, damaged pixels, etc. By reimaging the color pattern onto a silicon sensor, the image now can be digitally processed using a processor 22 to provide linearity, sharpening, contrast enhancement for fine feature enhancement, color balance, and eZoom, like any standard color imager. At the camera level all information can be recorded digitally or displayed on a visual viewer.

In nature, the Morpho structure is comprised of chitin, which has natural infrared absorbance in the LWIR and MWIR. Herein, material selection allows for selectively sensitizing the structure to different infrared bands. These materials include a polymer host which is either surface functionalized or volume embedded with metal or metal-oxide nanoparticles. Plasmon-enhanced light absorption and subsequent local heating is well established for metal nanoparticles, like gold, and metal oxide nanoparticles, like indium tin oxide (ITO). By changing the structure and shape of the nanoparticle, the localized surface plasmon resonance can be tuned from visible to NIR/SWIR. For an electrically conductive polymer host, a class of hybrid electrochromic materials comprised of polythiophenes and tin-doped indium oxide nanoparticles may be used. By modulating the voltage across the host polymer, this hybrid material modulates the absorbance spectrum in both the visible and NIR/SWIR, thereby changing the spectral detection band of the detector.

Physics based modeling is used to simulate the impact of localized heating on the color shift of the observed reflected light, and to optimize the nanostructured design within fabrication limits. The thermal transport of the nanoparticle filter to the polymer host is also stimulated for the different functionalizing/embedding strategies for each of the desired IR spectral bands.

In one embodiment of the system, the detector forms a patterned array of pixels with micrometer or sub-micrometer pixel pitch. Each pixel can be fabricated to have unique spectral and polarimetric response and thus a non-homogeneous detector array, in essence, acts as a patterned coded aperture which can be designed to optimally sample the incoming multidimensional optical field. The sampling pattern, created by the fabrication characteristics of each pixel, provides a compressive measurement of the multidimensional signal, from which all signal components can be reconstructed. If a measurement of the detector is denoted as an N-long vector y representing N pixels in the detector, and letting y be the M-long discretized incoming optical field, with M>>N and M=N.L.P.T being the number of discretized partitions in spectra (L), time (T), polarization (P), then a first approach to the forward imaging model can be approximated as $y=Ax$. A is the sensing matrix determined by hardware which must be optimized from the inverse problem. The theory of compressive sensing can be used to accurately reconstruct the entire multidimensional signal. In certain embodiments, a linear sensing model is accurate in representing the physical phenomena. In some cases, a nonlinear system of equations is more accurate. In such case, the inverse problem is adjusted accordingly. The imaging problem is further enriched if multiple measurements can be obtained by modifying the response of the detector array in time.

In certain embodiments, the CMOS camera allows construction of a small, lightweight, low cost camera core that is tailored to use with SWIR, MWIR or LWIR using an inexpensive COTS sensor. In some cases, a frame rate of >120 Hz with a global shutter can dynamically tune integration times. In this situation, goggles adapt to stationary and dynamic motion in real-time. The thermal response time of the analogy morpho photonic structures is limited to conductivity of the base material and the geometric form. Early estimates of these designs estimate a 100 to 200 Hz response. The digitation process optimizes the utility by allowing varying integration time where higher frame rates are utilized during the motion of goggle to reduce pixel smear (e.g., a warfighter running through the woods) and lower frames rates to sharpen imagery in a recon mode where the warfighter is looking for enemy combatants. Most thermal sensors (micro bolometers) have a fixed time constant which is compromise between both stationary and dynamic motion. Newer devices have short thermal time constants and by coupling them to an embedded optical, real-time scanner using a CMOS camera, the time constant is not effected or impacted by additional mass and or heat from a typical digital ROIC.

In some embodiments, the use of inertial measurement unit (IMU) stabilized imagery can correct image smear by applying sharpening filters tuned to direction and speed in real-time. An IMU is an electronic device that measures and reports a user's specific force, angular rate, and sometimes magnetic field surrounding a body, using a combination of accelerometers and gyroscopes, or even magnetometers.

The fine feature (<1 μm) of the morpho photonic structures lends itself to a low noise equivalent temperature difference (NETD), reducing optics and sensor size. NETD is a measure of how well a thermal imaging detector is able to distinguish between very small differences in thermal radiation in the image. When the noise in an image is equivalent to the smallest measurable temperature difference, the detector has reached its limit of its ability to resolve a useful thermal signal.

The small feature size offers the ability for large frame sizes in compact sensors. Typical thermal sensors offer 12 μm pixels as compared to the 1 μm morpho photonic structures, reducing size, weight and power.

Smart fusion of the three bands (e.g., SWIR, MWIR and LWIR) provides a real-time imager coupled with anomaly detection—e.g., snipers, trip wires, IEDs, camouflage and chemical detection. By using a cluster of small SWIR, MWIR and LWIR sensors, the information can be fused to develop a multi-spectral image scanning for chemical fingerprints. By placing electronics band filters in the sensors objectives, sub-band detection can be realized. In certain embodiments, a three sensor grouping of SWIR, MWIR and LWIR could reside adjacent to the warfighter's temple and weigh less than a couple ounces. The fused video feed would support a low light Vis/NIR sensor and can be presented on an eyeglass waveguide display.

In some embodiments, digital color correction of a non-linear response of the morpho photonic structures provides an image quality acceptable to the user without artifacts. As in all sensors, post processing provides linearity of the sensor response. By digitalizing the analogy morpho structure, color balance and uniformity is obtained using existing standard color imagery processing.

In some cases, low Cost SWIR/MWIR sensors provide next generation covert aiming lights; 1.9 to 4 μm. The deployment of low cost lasers in the SWIR/MWIR band could be viewed by the morpho photonic structures (MPS) camera core. A SWIR/MWIR MPS goggle could see the splash point of the SWIR/MWIR lasers indicating the aim-point of the warfighters weapon. Current aiming lights are no longer covert since the NIR band goggles have been commercialized. By extending the MWIR band, the aiming lights are not easily detected.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A broad band camera core comprising
   a morpho photonic structure having nanostructures for forming an optical diffraction grating, the morpho photonic structure being configured to generate a plurality of thermal gradients when exposed to thermal energy;
   a light source configured to provide white light to the morpho photonic structure, such that the plurality of thermal gradients alters the diffraction grating at the micro level and when exposed to white light only reflects a color corresponding to a matching thermal gradient, providing a color variation in a resulting thermal image; and
   re-imaging optics for collecting reflected color light and re-imaging onto a CMOS silicon imager to form a thermal sensor.

2. The broad band camera core of claim 1, further comprising a beam splitter for injecting white light.

3. The broad band camera core of claim 1, further comprising a combination of micro and macro optics for re-imaging.

4. The broad band camera core of claim 1, wherein the camera core weighs only a few ounces and fits in about a 2 $cm^3$ package.

5. The broad band camera core of claim 1, wherein the camera core has a frame rate of between 100 Hz and 200 Hz with a global shutter.

6. The broad band camera core of claim 1, wherein the camera core is used in goggles.

7. The broad band camera core of claim 1, wherein the camera core further comprises a digital processor to apply image processing to enhance the visual quality of the image for maximum, effective scene, target, and application information conveyance to the operator.

8. The broad band camera core of claim 1, wherein the camera core is configured for use with short wave infrared, mid wave infrared, and long wave infrared.

9. The broad band camera core of claim 7, wherein using a cluster of short wave infrared, mid wave infrared, and long wave infrared sensors to form a multi-spectral image is used to scan for chemical fingerprints.

\* \* \* \* \*